United States Patent

Iimura et al.

[15] 3,698,817
[45] Oct. 17, 1972

[54] METHOD AND APPARATUS FOR MANUFACTURING REFERENCE SCALES

[72] Inventors: Kazuo Iimura; Kiyoshi Sawada; Hiroki Kato, all of Numazu, Japan

[73] Assignee: Toshiba Kikai Kabushiki Kaisha, Tokyo-to, Japan

[22] Filed: Dec. 8, 1970

[21] Appl. No.: 96,211

[52] U.S. Cl. ................................................. 356/156
[51] Int. Cl. .............................................. G01b 11/00
[58] Field of Search....... 356/106, 108, 138, 152, 167

[56] References Cited

UNITED STATES PATENTS 3,573,805   4/1971   Kelling ...................... 356/106
3,574,292   4/1971   Butts ......................... 356/106

*Primary Examiner*—William L. Sikes
*Attorney*—Wenderoth, Lind & Ponack

[57] ABSTRACT

In a method of manufacturing a reference scale for use in a machine tool or a measuring machine having a numerically controlled positioning or position indicating device, a magnetic blank of a scale is secured to the machine, the quantity of movement of a movable member of the machine is measured by a laser beam length measuring device and the measured quantity is magnetically graduated on the blank.

4 Claims, 4 Drawing Figures

KAZUO IIMURA,
KIYOSHI SAWADA and
HIROKI KATO,
INVENTORS

KAZUO IIMURA,
KIYOSHI SAWADA and
HIROKI KATO,

INVENTORs

METHOD AND APPARATUS FOR MANUFACTURING REFERENCE SCALES

BACKGROUND OF THE INVENTION

This invention relates to a method and apparatus for manufacturing a reference scale for use in numerically controlled machine tools and measuring machines.

In order to accurately position a working tool of a numerically controlled machine tool at a designated position of a workpiece or to measure the position of a measuring head or instrument of a measuring machine a feedback system from a reference scale is generally employed. For example, in a system wherein the workpiece is held stationary and the position of the center of a rotary tool is designated by three dimensional X, Y, Z coordinates, linear reference scales or racks are attached to a movable member or a guide member cooperating therewith, said scales or racks extending in the directions X (longitudinal), Y (vertical) and Z (fore and aft), the distance over which the movable member has actually been moved or a position which is actually occupied by the movable member is read out in terms of absolute coordinates, read out values are fed back to a control device, the read out values are compared with a commanded value for the movement or with values of absolute coordinates, and the difference of these values is amplified so as to drive the movable member by a servomotor in a direction to reduce to zero the difference between the commanded value and the actual value. This system is well known in the art and according to this system it is possible to correctly position the movable member according to the commanded value. However, in digitally controlled machine tools and the like of large capacity, this system is not yet sufficient. This is because that in large machines it is necessary to use long scales which are prepared by joining a plurality of reference scales of shorter length and such long scales involve errors which are caused when they are joined or mounted on the machine. Further, as the distance between the center of the working tool and the reference scale or scales is large, even when the movable member is correctly positioned with respect to the reference scale the center of the tool will not be correctly positioned with respect to the remotely positioned scale due to deformation of the frame of the machine tool owing to heating or the weight of the frame or manufacturing errors although in a manually operated machine tool it is usual to measure the accuracy of the machining of a workpiece while it is mounted on the machine and to immediately correct the error by remachining. The purpose of the numerically controlled machine tool is to eliminate such measurement and correction. It has also been proposed to directly measure the position of the machined portion by some automatic means, but heretofore no satisfactory such device has been available on the market.

SUMMARY OF THE INVENTION

It is therefore an object of this invention to provide an improved method and apparatus for manufacturing a reference scale for accurately positioning the working tool of a machine tool or to measure the position of the measuring head of a measuring machine.

A further object of this invention is to provide a novel method and apparatus for manufacturing a long seamless reference scale suitable for use in large machine tools or measuring machines. Another object of this invention is to provide a new and improved reference scale which can position a working tool at a correct position irrespective of manufacturing errors of the component parts of the machine.

According to one aspect of the invention, in a machine tool or a measuring machine having numerically controlled positioning or position indicating means, there is provided a method of manufacturing a reference scale comprising the steps of attaching a magnetic blank of a scale to the machine, measuring the quantity of movement of a movable member of the machine by means of a laser beam length measuring device and magnetically graduating the blank according to the measured quantity of the movement.

According to another aspect of the invention, for use in a machine tool or a measuring machine of the type including a numerically controlled positioning or position indicating means, there is provided apparatus for manufacturing a reference scale comprising a movable member positioned at a definite position and moved in a predetermined direction, a magnetic blank of a scale mounted on the machine, a laser beam length measuring head positioned to transmit and receive a laser beam to and from the movable member for generating an electric signal each time the movable member is moved a predetermined distance, and a magnetic head for magnetically recording the signal on the blank as a graduation whereby to form a scale.

In the case of a machine tool the movable member is a reflective mirror mounted on the machine in the place of the working tool thereof. As is well known in the art the laser beam length measuring apparatus can measure large lengths at high accuracies and the scale is graduated magnetically so that the reference scale embodying the invention is extremely accurate and can be prepared readily.

DESCRIPTION OF THE PREFERRED EMBODIMENTS

Figure 1:
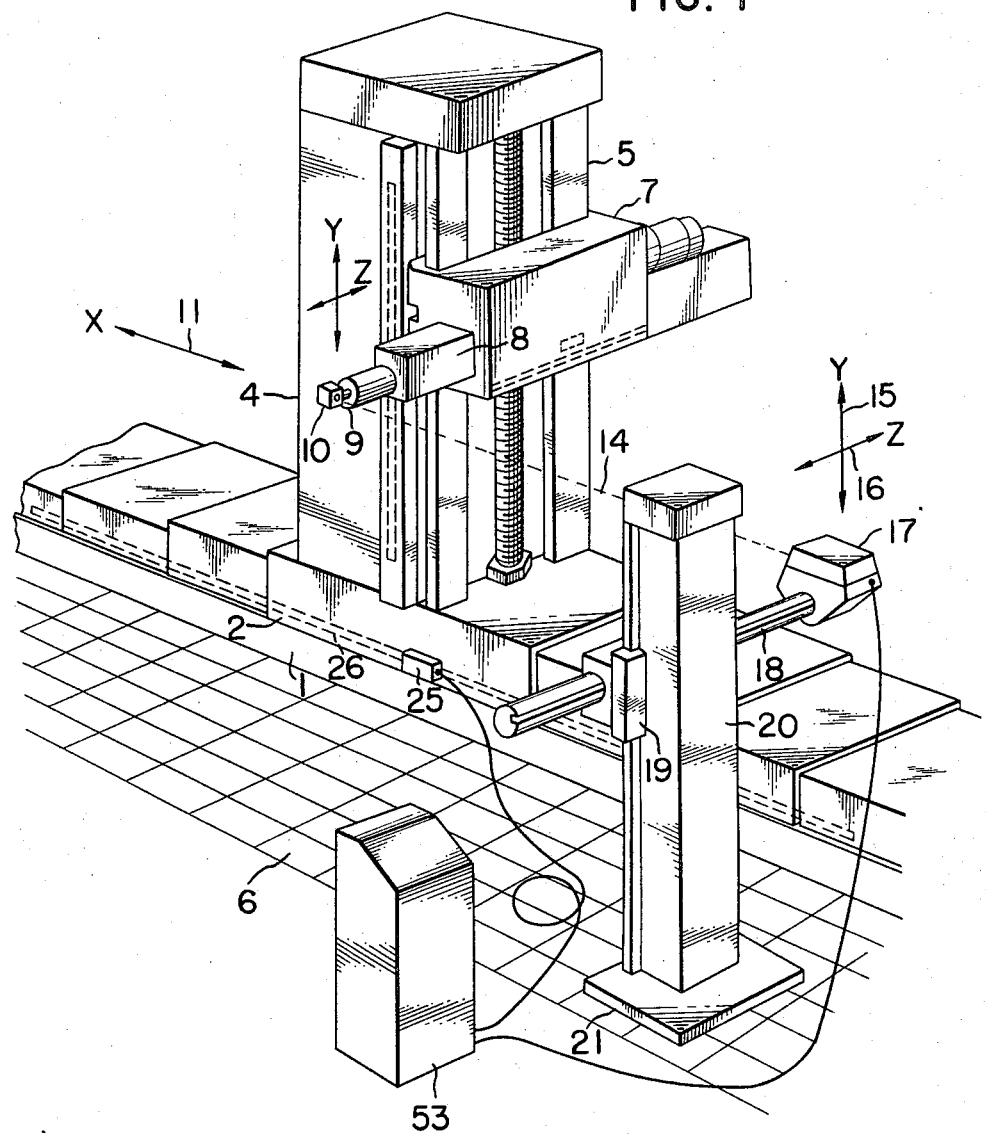
FIG. 1 shows a perspective view of a boring machine embodying the invention.

The boring machine shown in FIG. 1 comprises a horizontal bed 1, a sliding bed 2 mounted on horizontal bed 1 to be slidable in the X direction, a column 4 mounted on slidable bed 2 and a head 7 which is guided by a vertical guide surfaces 5 of column 4 to move in the vertical or Y direction.

Head 7 contains a ram 8 to be movable in the fore and aft direction or Z direction. A rotary spindle 9 is received in ram 8 to be slidable in the same direction as the ram or Z direction. Usually, a suitable cutting tool is secured on the outer end of rotary spindle 9 to perform various cutting operations. In this embodiment, a reflective mirror 10 of a laser beam interference type length measuring device is substituted for the cutting tool. It is now assumed that the reflective mirror 10 is positioned at a height Y15 and at a projected position Z16 along the Z axis and is successively moved in the direction of arrow 11 along the X axis. A sensor 17 is positioned on the path of movement of the center of the reflective mirror 10, said sensor functioning to emanate laser light and measure the fringes in the same manner as a well known laser beam interference type length measuring device. Sensor 17 comprises an arm 18 arranged to slide in the Z direction, a saddle 19 arranged to slide in the Y direction and a column 20 for guiding the saddle. The column 20 is fixed to a surface plate 6 through a base 21, said surface plate being used to support a workpiece, now shown. Although the laser beam interference type length measuring device may be of any well known type, in this invention, use is made of its ability of measuring at high accuracies longer distance between two widely spaced apart points when compared with a conventional measuring means such as a scale. On one side surface of bed 1 are provided a blank of an electromagnetic type reference scale 26 and a magnetic scale write and read head 25 which are utilized to measure positions along the horizontal X direction. Similar devices are also provided in the Y and Z directions. However, these position measuring devices are different from the reference scale of prior art numerically controlled machine tools of the feedback type particularly in that scale 26 has no previously marked graduations. The error of measurement of the laser beam interference type length measuring device presently available on the market is less than 0.001mm/meter for a measured length of more than 12 meters and such devices are constructed such that each time a counter circuit 53 of the measuring device counts the longitudinal movement of the reflecting mirror 10 along bed 1 over a designated definite distance a signal is generated which is applied to the magnetic graduation head 25 through a cable. Head 25 functions to magnetically graduate the blank of scale 26 and to read graduations thereon. Consequently, each time reflecting mirror 10 is moved over a definite distance a magnetic graduation is marked on the magnetic scale and a slight swinging motion such as pitching or yawing of the column of spindle due to manufacturing errors of the machine results in graduations of unequal spacings. Accordingly, when such graduations of unequal spacings are read out to position the reflecting mirror 10 the positioning of the reflecting mirror is made with the same accuracy as the measuring accuracy of the laser beam interference type length measuring device.

Figure 2:
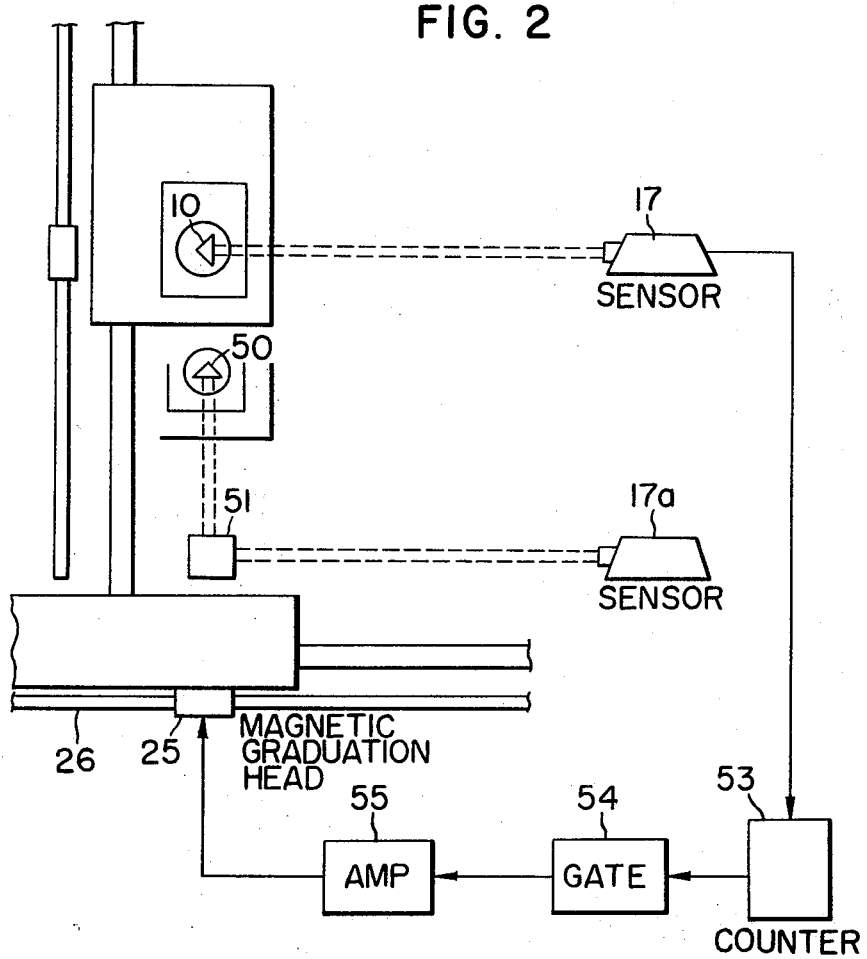
FIG. 2 is a block diagram to explain the operation of this invention.
Figure 3:
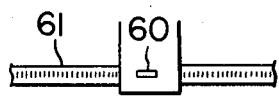
FIG. 3 shows a model of a single row magnetic scale.
Figure 4:
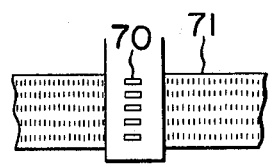
FIG. 4 shows a model of a multi-row magnetic scale.

Turning now to FIG. 2 which shows a block diagram explaining the principle of operation of a laser beam interference type length measuring device and a magnetic graduation device, as the reflective mirror 10 is moved to the left or right as viewed in FIG. 2, the length of the optical path through which the laser beam emitted from sensor 17 travels toward the reflective mirror and is then reflected back to sensor 17 is varied. This variation in the optical path is measured by a well known device which counts the number of fringes which are formed by the interference of the laser beam. Signals from sensor 17 are supplied to counter circuit 53 to produce a signal by a gate circuit 54 each time a definite number of the signals from the sensor is counted. The signal from the gate circuit is applied to magnetic graduation head 25 through an amplifier 55 to graduate magnetic scale 26. In the same manner, movements of a reflective mirror 50 in the vertical direction, or along the Y axis, are also graduated by means of a refractive mirror 51 and a second sensor 17a. Movements of the reflective mirror along the Z axis are also graduated in the same manner. Magnetic scales prepared in this manner function as reference scales that assure correct positioning of a reflective mirror or a cutting tool which is positioned on a definite point in the Y-Z plane and is moved in the X direction so that when the position of a point in the Y-Z plane varies substantially, in certain cases such scales are no longer effective. FIG. 3 shows a single write-read head 60 and a single reference magnetic scale whereas FIG. 4 shows a plurality of write-read heads 70 and a plurality of reference magnetic scales 71 of the same number as the heads. These scales 71 are used as references for the movements of a tool positioned at one of a plurality of positions in the Y-Z plane and is moved in the X direction. Since it is possible to readily erase the magnetic graduations of these magnetic scales, it is possible to regraduate the scale whenever the accuracy of the machine tool varies.

The reference scale of this invention is free from errors which are caused by inaccurate mounting of a conventional scale and can be formed as a single continuous or seamless scale on continuous or joined scale members having a length commensurate with the limit of measurement of the well known laser beam length measuring device, thus assuring correct positioning of the tool over a long length. If magnetic graduations are marked with reference to the center of the tool of the machine tool, manufacturing errors in the component parts thereof do not affect correct positioning of the tool when it is moved along one of the X, Y, Z axes.

Although the invention has been shown and described in terms of preferred embodiments thereof it is to be understood that many changes and modifications will occur to one skilled in the art within the scope of the invention as defined in the appended claims. For example, the scale may be graduated with a magnetic ink.

What is claimed is:

1. For use in a machine tool or a measuring machine of the type including a numerically controlled positioning or position indicating means, the apparatus for manufacturing a reference scale comprising a movable member positioned at a definite position on said machine and moved in a predetermined direction, a magnetic blank of a scale mounted on said machine, a laser beam length measuring head positioned to transmit and receive a laser beam to and from said movable member for generating an electric signal each time said movable member is moved a predetermined distance, and at least one magnetic head for magnetically recording said signal on said blank as a graduation whereby to form said reference scale.

2. The apparatus according to claim 1 wherein said movable member is a reflective mirror mounted at the place of a working tool of said machine tool and further comprising means to position said reflective mirror at a definite position in a plane including two axes of rectangular cordinates and to move said reflective mirror in the direction of a remaining axis.

3. The apparatus according to claim 2 wherein said at least one magnetic head comprises a plurality of magnetic heads corresponding to respective positions of said reflective mirror in said plane.

4. In a machine tool or a measuring machine having a numerically controlled positioning or position indicating means, a method of manufacturing a reference scale comprising the steps of attaching a magnetic blank of a scale to said machine, mounting a reflective mirror in place of a movable member of said machine, projecting a laser beam upon said reflective mirror and causing said reflective mirror to reflect said laser beam, receiving the reflected laser beam and magnetically graduating said magnetic blank in accordance with the received reflected laser beam which represents the movement of said reflective mirror.

* * * * *